United States Patent
Ma et al.

(10) Patent No.: US 9,357,542 B2
(45) Date of Patent: *May 31, 2016

(54) METHOD AND RADIO NETWORK CONTROLLER FOR TRANSMITTING INFORMATION

(71) Applicant: HUAWEI TECHNOLOGIES CO.,LTD., Shenzhen, Guangdong (CN)

(72) Inventors: Jie Ma, Beijing (CN); Bo Lin, Beijing (CN)

(73) Assignee: HUAWEI TECHNOLOGIES CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/318,583

(22) Filed: Jun. 28, 2014

(65) Prior Publication Data

US 2014/0314017 A1 Oct. 23, 2014

Related U.S. Application Data

(63) Continuation of application No. 13/305,138, filed on Nov. 28, 2011, now Pat. No. 8,797,980, which is a continuation of application No. 12/769,809, filed on Apr. 29, 2010, now Pat. No. 8,780,822, which is a continuation of application No. PCT/CN2008/072841, filed on Oct. 27, 2008.

(30) Foreign Application Priority Data

Oct. 31, 2007 (CN) .......................... 2007 1 0124236

(51) Int. Cl.
*H04W 72/04* (2009.01)
*H04W 92/12* (2009.01)
*H04L 5/00* (2006.01)

(52) U.S. Cl.
CPC ........... *H04W 72/042* (2013.01); *H04L 5/0091* (2013.01); *H04W 92/12* (2013.01); *H04W 72/0433* (2013.01)

(58) Field of Classification Search
None
See application file for complete search history.

(56) References Cited

U.S. PATENT DOCUMENTS 6,757,293 B1 6/2004 Chuah et al.
7,711,365 B2 5/2010 Nakamata
(Continued)

FOREIGN PATENT DOCUMENTS

CN 1451251 A 10/2003
CN 1472901 A 2/2004
(Continued)

OTHER PUBLICATIONS

3GPP TS 23.401 V1.0.0; 3rd Generation Partnership Project; Technical Specification Group Services and System Aspects; GPRS enhancements for E-UTRAN access (Release 8); May 2007; total 50 pages.

(Continued)

*Primary Examiner* — Kouroush Mohebbi
(74) *Attorney, Agent, or Firm* — Huawei Technologies Co., Ltd

(57) ABSTRACT

A method for transmitting information includes: by a NodeB, receiving a message for setting up/reconfiguring a shared Enhanced Dedicated Channel (E-DCH) transmission channel from a Radio Network Controller (RNC); and setting up the shared E-DCH transmission channel according to parameters in the message, and exchanging information with the RNC through an established shared E-DCH transmission bearer.

24 Claims, 2 Drawing Sheets

(56) References Cited

U.S. PATENT DOCUMENTS

| | | |
|---|---|---|
| 7,797,012 B1 | 9/2010 | Longoni et al. |
| 7,864,722 B2 | 1/2011 | Yi et al. |
| 7,894,390 B2 | 2/2011 | Nakamata et al. |
| 7,894,444 B2 | 2/2011 | Lohr et al. |
| 8,730,887 B2 | 5/2014 | Ma et al. |
| 2002/0045448 A1 | 4/2002 | Park et al. |
| 2003/0016698 A1 | 1/2003 | Chang et al. |
| 2003/0223360 A1 | 12/2003 | Yamazaki |
| 2004/0017789 A1 | 1/2004 | Hoeynck et al. |
| 2004/0160925 A1 | 8/2004 | Heo et al. |
| 2005/0053035 A1* | 3/2005 | Kwak et al. ............ 370/331 |
| 2005/0063347 A1 | 3/2005 | Sarkkinen et al. |
| 2005/0207359 A1* | 9/2005 | Hwang et al. .......... 370/278 |
| 2005/0249118 A1 | 11/2005 | Terry et al. |
| 2005/0254511 A1 | 11/2005 | Kekki |
| 2006/0019671 A1 | 1/2006 | Chemiakina et al. |
| 2006/0114877 A1 | 6/2006 | Heo et al. |
| 2006/0156184 A1 | 7/2006 | Kim et al. |
| 2006/0223567 A1 | 10/2006 | Kwak et al. |
| 2007/0010270 A1 | 1/2007 | Dillon |
| 2007/0042785 A1 | 2/2007 | Nakamata |
| 2007/0047486 A1 | 3/2007 | Lee et al. |
| 2007/0140123 A1 | 6/2007 | Fukui |
| 2007/0218901 A1 | 9/2007 | Tenny |
| 2007/0258402 A1* | 11/2007 | Nakamata et al. ........... 370/329 |
| 2008/0085719 A1 | 4/2008 | Kuchibhotla et al. |
| 2008/0108311 A1 | 5/2008 | Shindo |
| 2008/0123585 A1 | 5/2008 | Granzow et al. |
| 2008/0182594 A1* | 7/2008 | Flore et al. ............ 455/458 |
| 2008/0253300 A1 | 10/2008 | Wakabayashi et al. |
| 2008/0273610 A1 | 11/2008 | Malladi et al. |
| 2008/0311923 A1 | 12/2008 | Petrovic et al. |
| 2009/0022134 A1 | 1/2009 | Chun et al. |
| 2009/0088185 A1 | 4/2009 | Beale |
| 2009/0135771 A1 | 5/2009 | Pani et al. |
| 2009/0185540 A1 | 7/2009 | Pelletier et al. |
| 2009/0268676 A1 | 10/2009 | Wigard et al. |
| 2012/0069811 A1 | 3/2012 | Ma et al. |
| 2014/0177571 A1 | 6/2014 | Ma et al. |

FOREIGN PATENT DOCUMENTS

| | | |
|---|---|---|
| CN | 1534915 A | 10/2004 |
| CN | 1627844 A | 6/2005 |
| CN | 1645961 A | 7/2005 |
| CN | 1687244 A | 10/2005 |
| CN | 1790971 A | 6/2006 |
| CN | 1867161 A | 11/2006 |
| CN | 1889534 A | 1/2007 |
| CN | 1943144 A | 4/2007 |
| CN | 101006688 A | 7/2007 |
| CN | 101030810 A | 9/2007 |
| CN | 101030932 A | 9/2007 |
| CN | 101031094 A | 9/2007 |
| CN | 101035368 A | 9/2007 |
| CN | 101203048 A | 6/2008 |
| CN | 101426254 A | 5/2009 |
| EP | 1689127 A1 | 8/2006 |
| EP | 1737262 A1 | 12/2006 |
| EP | 1755355 A1 | 2/2007 |
| EP | 1796335 A1 | 6/2007 |
| EP | 1838057 A2 | 9/2007 |
| EP | 1841265 A2 | 10/2007 |
| EP | 2207276 A1 | 7/2010 |
| JP | 2000228787 A | 8/2000 |
| WO | 0172080 A1 | 9/2001 |
| WO | 2004028041 A1 | 4/2004 |
| WO | 2005104667 A2 | 11/2005 |
| WO | 2006081874 A1 | 8/2006 |
| WO | 2007003707 A1 | 1/2007 |
| WO | 2007073683 A1 | 7/2007 |
| WO | WO 2009016260 A1 * | 2/2009 |
| WO | 2009055536 A2 | 4/2009 |
| WO | 2009059518 A1 | 5/2009 |

OTHER PUBLICATIONS

China Mobile, Huawei; Discussion on the structure of S-TMSI; 3GPP TSG SA WG2 Meeting #59; S2-073255; Agenda Item: 8.2.2 / 8.2.7; Aug. 27-31, 2007; Helsinki, Finland; total 3 pages.

Vodafone; Globally Unique Temporary Identities; GPP TSG SA WG2; TD S2-075726; Nov. 12-16, 2007; Agenda Item: 8.2.9/8.2.8; total 4 pages.

3GPP TS 25.433 V6.13.0; 3rd Generation Partnership Project; Technical Specification Group Radio Access Network; UTRAN Iub interface Node B Application Part (NBAP) signalling (Release 6); Mar. 2007; total 762 pages.

ETSI TS 125 433 V6.13.0; Universal Mobile Telecommunications System (UMTS); UTRAN Iub interface Node B; Application Part (NBAP) signalling (3GPP TS 25.433 version 6.13.0 Release 6); Mar. 2007; total 759 pages.

LG Electronics; Discussion on RACH enhancements; 3GPP TSG-RAN WG2 #59bis; R2-074165; XP-002519687; Agenda Item 7.5.5; Shanghai, China, Oct. 8-12, 2007; total 2 pages.

3GPP TS 25.433 V7.6.0; 3rd Generation Partnership Project; Technical Specification Group Radio Access Network; UTRAN Iub interface Node B Application Part (NBAP) signalling (Release 7); Sep. 2007; total 971 pages.

NSN, Nokia; Enhanced Random Access with E-DCH; 3GPP TSG-RAN WG2 Meeting #59bis; R2-074010; Agenda item 7.5.5; Shanghai, China, Oct. 8-12, 2007; total 2 pages.

Nokia Siemens Networks, Nokia; On Resource Allocation; 3GPP TSG-RAN WG3 Meeting #60; R3-081424; Agenda item 15; Kansas City, USA; May 5-9, 2008; total 2 pages.

3GPP TS 25.427 V7.5.0; 3rd Generation Partnership Project; Technical Specification Group Radio Access Network; UTRAN Iub/Iur interface user plane protocol for DCH data streams (Release 7); Sep. 2007; total 44 pages.

NSN, Nokia; Enhanced CELL_FACH state with E-DCH; 3GPP TSG-RAN WG3 Meeting #57bis; R3-071927; Agenda item: 15; Sophia Antipolis, France, Oct. 8-11, 2007; total 2 pages.

NSN, Nokia; Further discussion on enhanced CELL_FACH in REL8; 3GPP TSG-RAN WG2 Meeting #59; R2-073254; Agenda item: 7.6; Athens, Greece, Aug. 20-24, 2007; total 3 pages.

3GPP TR 25.827 V7.0.0; 3rd Generation Partnership Project; Technical Specification Group Radio Access Network; 1.28 Mcps TDD Enhanced Uplink; Physical Layer Aspects(Release 7); Mar. 2007; total 31 pages.

3GPP TS 25.319 V7.3.0; 3rd Generation Partnership Project; Technical Specification Group Radio Access Network; Enhanced uplink; Overall description; Stage 2(Release 7); Sep. 2007; total 44 pages.

3GPP TS 25.321 V7.6.0; 3rd Generation Partnership Project; Technical Specification Group Radio Access Network; Medium Access Control (MAC) protocol specification (Release 7); Sep. 2007; total 146 pages.

3GPP TS 25.433 V6.15.0; 3rd Generation Partnership Project; Technical Specification Group Radio Access Network; UTRAN Iub interface Node B Application Part (NBAP) signalling(Release 6); Sep. 2007; total 765 pages.

3GPP TS 25.435 V7.6.0; 3rd Generation Partnership Project; Technical Specification Group Radio Access Network; UTRAN Iub Interface User Plane Protocols for Common Transport Channel data streams(Release 7); Sep. 2007; total 52 pages.

3GPP TR 25.877 V5.1.0, 3rd Generation Partnership Project; Technical Specification Group Radio Access Network; High Speed Downlink Packet Access;Iub/Iur protocol aspects (Release 5), Jun. 2002,total 50 pages.

TSG-RAN Working Group 3 Meeting #25 R3-013321,"UEs Multiplexing in Frame Protocol for HS-DSCH",Siemens, Nov. 26-30, 2001,total 6 pages.

\* cited by examiner

METHOD AND RADIO NETWORK CONTROLLER FOR TRANSMITTING INFORMATION

CROSS REFERENCE TO RELATED APPLICATIONS

This application is a continuation of U.S. patent application Ser. No. 13/305,138, filed on Nov. 28, 2011. U.S. patent application Ser. No. 13/305,138 is a continuation of U.S. patent application Ser. No. 12/769,809, filed on Apr. 29, 2010, now U.S. Pat. No. 8,780,822. U.S. patent application Ser. No. 12/769,809 is a continuation of International Application No PCT/CN2008/072841, filed on Oct. 27, 2008. The International Application claims benefit of priority to Chinese Patent Application No. 200710124236.6, filed on Oct. 31, 2007. All of the aforementioned patent applications are hereby incorporated by reference in their entireties.

TECHNICAL FIELD

The present invention relates to mobile communication technologies, and in particular, to a method and radio network controller for transmitting information.

BACKGROUND

A mobile communication system includes a User Equipment (UE), a base station, and a radio network control device. For ease of description, it is assumed that the base station is a NodeB of Universal Mobile Telecommunications System, and that the radio network control device is a Radio Network Controller (RNC) hereunder. The channel between the UE and the NodeB and the channel between the NodeB and the RNC are Random Access Channels (RACHs).

To enhance the data transmission rate between the UE and the NodeB, a solution is put forward in the industry: using High Speed Downlink Packet Access (HSDPA) in the downlink common channel, thus making the theoretical downlink transmission rate as high as 100 Kbps. However, the downlink transmission rate is affected by the uplink transmission rate. For example, uplink transmission is currently performed on a shared RACH, which leads to slow uplink response and affects the downlink transmission rate.

To solve the problem, another solution is put forward in the industry: using High Speed Uplink Packet Access (HSUPA) to implement random access. This solution requires the UE to use an Enhanced Dedicated Channel (E-DCH) transmission channel to transmit the specific messages in the uplink transmission at random access. That is, an E-DCH should be used between the UE and the NodeB. This solution increases the speed of exchanging information between the UE and the NodeB massively.

During implementing of the present invention, the inventor finds at least the following problems in the prior art.

To increase the speed of transmitting the data sent by the UE in the uplink direction between the RNC and the NodeB, an E-DCH transmission channel may also be used between the RNC and the NodeB. Because the UE data quantity is small and intermittent, if a dedicated E-DCH channel is used between the RNC and the NodeB, resources are wasted drastically.

The channel between the RNC and the NodeB is port-based. This channel is different from the air interface based channel between the UE and the NodeB, and the method for allocating an E-DCH transmission channel between the UE and the NodeB at random access is not applicable to allocation of the channel between the RNC and the NodeB.

SUMMARY

The embodiments of the present invention provide a method for transmitting information to save the channel resources between the RNC and the NodeB while speeding up the information transmission between the RNC and the NodeB. In addition, the embodiments of the present invention provide a non transitory computer readable medium and a radio network controller for transmitting information.

The embodiments of the present invention provide a method for transmitting information. The method includes: sending, by a radio network controller (RNC), a message for setting up a shared enhanced dedicated channel (E-DCH) to a NodeB, where the message comprises following parameters: a signature list, a relevant E-DCH physical layer parameter, a transmission channel parameter, and a transmission bearer parameter, the signature list has a mode as Preamble Signatures for a physical random access channel (PRACH); and receiving, by the RNC, a response from the NodeB, where the response comprises information about the shared E-DCH that set up by the NodeB according to the message.

The embodiments of the present invention provide a Radio Network Controller (RNC). The RNC includes: a transmitter, configured to send a message for setting up a shared enhanced dedicated channel (E-DCH) to a NodeB, where the message comprises following parameters: a signature list, a relevant E-DCH physical layer parameter, a transmission channel parameter, and a transmission bearer parameter, where the signature list has a mode as Preamble Signatures for a physical random access channel (PRACH); and a receiver, configured to receive a response from the NodeB, where the response comprises information about the shared E-DCH that set up by the NodeB according to the message.

The embodiments of the present invention provides a non transitory computer readable medium storing executable codes, when executed by a processor of a base station, cause the base station to perform following steps: receiving a message for setting up a shared enhanced dedicated channel (E-DCH) from a radio network controller (RNC), wherein the message comprises following parameters: a signature list, a relevant E-DCH physical layer parameter, a transmission channel parameter, and a transmission bearer parameter, wherein the signature list has a mode as Preamble Signatures for a physical random access channel (PRACH); and setting up the shared E-DCH according to the message.

Compared with the prior art, the embodiments of the present invention use the NodeB to receive the message for setting up/reconfiguring a shared E-DCH transmission channel from the RNC, and set up the shared E-DCH transmission channel based on the message. Afterward, through the shared E-DCH transmission channel, the NodeB exchanges information with the RNC. Therefore, the NodeB and the RNC can share the E-DCH transmission bearer, thus saving the channel resources between the NodeB and the RNC while speeding up the information transmission between the RNC and the NodeB.

DETAILED DESCRIPTION OF EMBODIMENTS

To make the technical solution, objectives and merits of the present invention clearer, the following describes the embodiments of the present invention in detail with reference to some accompanying drawings.

Figure 1:
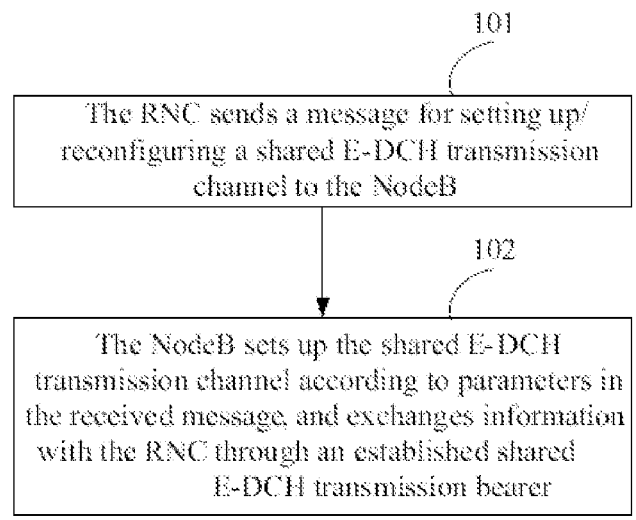
FIG. 1 is a sequence diagram of configuring a shared E-DCH transmission channel between an RNC and a NodeB according to an embodiment of the present invention.

As shown in FIG. 1, the process of configuring a shared E-DCH transmission channel between an RNC and a NodeB according to an embodiment of the present invention includes the following content.

Step 101: The RNC sends a message for setting up/reconfiguring a shared E-DCH transmission channel to the NodeB, requesting the NodeB to set up an E-DCH transmission channel.

It is assumed herein that the setup/reconfiguration message sent by the RNC to the NodeB is a setup/reconfiguration request.

The RNC needs to send a request to the NodeB, notifying the parameters required for channel setup/reconfiguration. For example, the parameters may include: the signature list and/or the relevant physical layer channel parameters used when the UE performs random access through the E-DCH, and/or the relevant physical layer channel parameters; and the parameters may further include one or more of these parameters: the physical layer parameters required when the UE performs random access through the E-DCH, transmission channel parameters required when the UE performs random access through the E-DCH, or transmission bearer parameters required when the UE performs random access through the E-DCH, or may further include one or all of the above two types of parameters. The parameters may be sent through a new message; or the parameters are added into a message of the existing process, which means the parameters are sent through the existing process.

If the RNC sends the signature list used when the UE performs random access through the E-DCH to the NodeB, the RNC may send the signature list in many modes. This embodiment provides several modes: (1) A table is stipulated in the protocol, and a serial number of the table is assigned and sent; or (2) a signature sequence is configured and sent; or (3) the signature list is sent in the mode like Preamble Signatures in the traditional Physical Random Access Channel (PRACH). These sending modes may be performed in the process of setting up the common transmission channel.

If the RNC sends the physical layer channel parameters required when the UE performs random access through the E-DCH to the NodeB, the RNC may send the parameters in many modes. This embodiment provides the specific processing modes for the RNC to notify the NodeB to assign the relevant resources through configuration of the channel such as the Arrest Indication Channel (AICH), High Speed-DSCH-related Shared Control Channel (HS-SCCH), and High Speed Physical Downlink Shared Channel (HS-PDSCH). The detailed modes are as follows.

(1) An Arrest Indication (AI) is added into an AICH sent to the NodeB, indicating that the AICH may be used at the time of performing random access through the E-DCH. In this case, the AICH may be modified in the common transmission setup process.

(2) The second mode is specific to the HS-SCCH. In this mode, the HS-SCCH sent to the NodeB may carry at least one of these items: physical-layer parameters, HS-SCCH format number, and HS-SCCH time sequence relation. In this case, the HS-SCCH may be modified in the process of reconfiguring the physical shared channel. The physical-layer parameters may be channelized codes and power. The power may be the maximum transmit power and/or initial transmit power;

for the HS-SCCH format number, the current HS-SCCH comes in three formats, and the specific format needs to be indicated; the HS-SCCH time sequence relation may be a contrast between the HS-SCCH and an absolute time sequence, for example, an offset from the AICH or Primary Common Control Physical Channel (P-CCPCH), measured in timeslots or 256 chips.

(3) The third mode is specific to the HS-PDSCH. In this mode, the HS-PDSCH sent to the NodeB may be added at least one of these items: physical-layer parameters, HS-PDSCH time sequence relation, and transmission channel parameters. In this mode, the HS-PDSCH may be modified in the process of setting up the common transmission channel. Besides, the physical-layer parameters may include at least one of these items: channelized code, modulation mode, power, and TB size; the HS-PDSCH time sequence relation may be a contrast between an HS-PDSCH and an absolute time sequence, for example, an offset from an AICH or P-CCPCH, measured in timeslots or 256 chips; the transmission channel parameters include an indication of the MAC format, specifically including MAC-hs, MAC-ehs in DPA enhancement, or a newly defined format.

If the RNC sends the relevant E-DCH physical-layer parameters required when the UE performs random access through the E-DCH, transmission channel parameters required when the UE performs random access through the E-DCH, and the transmission bearer parameters required when the UE performs random access through the E-DCH, etc., to the NodeB, the RNC may send the parameters in many modes as the same.

The E-DCH physical-layer parameters may include the parameters in the following Table 1, and such parameters may be added in the process of setting up the common transmission channel.

E-DPCH Information
>Maximum Set of E-DPDCHs
>Puncture Limit
>E-TFCS Information
>E-TTI
>E-DPCCH Power Offset
>HARQ Info for E-DCH
E-DCH FDD Information
F-DPCH Information
>Power Offset Information
>>PO2
>FDD TPC DL Step Size
>Limited Power Increase
>Inner Loop DL PC Status The transmission channel parameters may include the parameters in the following Table 2. Specifically, an indication may be added into the shared physical channel reconfiguration to indicate that the parameters can be used at the time of performing random access through the E-DCH. Alternatively, the parameters are directly added into the process of setting up the common transmission channel.

E-AGCH And E-RGCH/E-HICH FDD Scrambling Code
E-AGCH Code FDD Information
E-RGCH/E-HICH Code FDD Information The transmission bearer may include the optional parameters in the following Table 3. These optional parameters may be added in the process of setting up the common transmission channel.

| IE/Group Name | Pres- ence | Range | IE Type and Reference | Semantics Description |
|---|---|---|---|---|
| RL Specific E-DCH Information | | 1..<maxnoo fEDCHMA CdFlows> | | |
| >Binding ID | O | | 9.2.1.4 | Shall be ig- nored if bearer establishment with ALCAP. |
| >Transport Layer Address | O | | 9.2.1.63 | Shall be ig- nored if bearer establishment with ALCAP. |
| >>>>Common Transport Channel ID | O | | 9.2.1.14 | |
| >>>>Transport Format Set | O | | 9.2.1.59 | For the UL. |
| >>>>TNL QoS | O | | 9.2.1.58A | Shall be ig- nored if bearer establishment with ALCAP. |
| E-AGCH Power Offset | O | | 9.2.2.13Id | |
| E-RGCH Power Offset | O | | 9.2.2.13Ie | |
| E-HICH Power Offset | O | | 9.2.2.13If | |

Step 102: The NodeB sets up the shared E-DCH transmission channel according to parameters in the received message, and exchanges information with the RNC through an established shared E-DCH transmission bearer.

The NodeB may return a channel setup/reconfiguration response to the RNC, notifying the information about the established E-DCH transmission channel.

The NodeB sets up the corresponding shared E-DCH transmission channel according to the parameters sent by the RNC, and returns the information about the established channel to the RNC. Specifically, the transmission-layer address and/or Binding ID is notified to the RNC. Alternatively, other relevant parameters of the E-DCH transmission channel may be notified to the RNC.

Moreover, after the shared E-DCH transmission channel is set up, if the NodeB needs to send UE information to the RNC, the UE ID needs to be notified to the RNC. Specifically, after receiving the information sent by the UE, the NodeB also needs to add the UE ID into the received information, with a view to modifying the data to new E-DCH data, or with a view to modifying the E-DCH FP frame corresponding to the data to the FP frame that carries the UE ID.

The modified FP frame is shown in the following Table 4.

| Header CRC | | FT |
|---|---|---|
| Header CRC cont | | FSN |
| Spare | | Numbers of subframe |
| CFN | | |
| UEid1 | | |
| UEid1 | | |
| Ueid2 | | |
| Ueid2 | | |
| Ueidn | | |
| Ueidn | | |
| Ue 1 | Nof HARQ Retransm | 1st subframe No. |
| N of MAC-es PDUs | | First DDI |
| First DDI | First N | |
| Last DDI | | Last N |
| Last N cont | PAd | |
| Ue 1 | Nof HARQ Retransm | Last subframe No. |
| N of MAC-es PDUs | | First DDI |
| First DDI | First N | |
| Last DDI | | Last N |
| Last N cont | PAd | |
| Ue 1 | Nof HARQ Retransm | Last subframe No. |
| N of MAC-es PDUs | | First DDI |
| First DDI | First N | |
| Last DDI | | Last N |
| Last N cont | PAd | |
| New IE flag | | |
| First MAC-es PDU of 1st subframe of UE1 | | |
| Last MAC-es PDU of Last subframe of UE1 | | |
| Last MAC-es PDU of Last subframe of UEn | | |
| Payload CRC | | |
| Payload CRC cont | | |

In the foregoing solution which uses a shared E-DCH transmission channel to transmit data to the RNC, it is necessary to modify the processing logic of the RNC so that the RNC can resolve the UE ID. Specifically, the MAC-es entity may be modified accordingly. Nevertheless, the modification is based on the precondition that the entity corresponding to the resolved UE ID in the RNC is a MAC-es entity. If the entity corresponding to the UE ID is another entity, the entity needs to be modified accordingly.

The foregoing embodiment reveals that: Random access can also be performed between the RNC and the NodeB through an E-DCH, thus saving the channel resources between the RNC and the NodeB.

Figure 2:
FIG. 2 shows a structure of a system according to an embodiment of the present invention.
Figure 3:
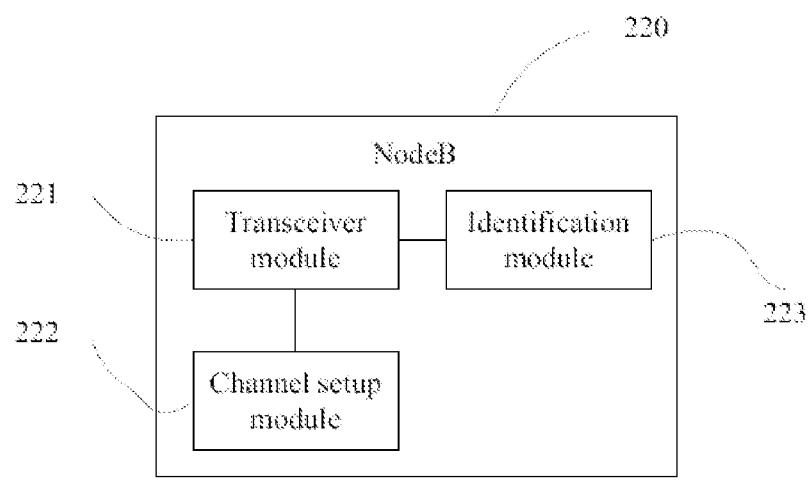
FIG. 3 shows a structure of a NodeB according to an embodiment of the present invention.

As shown in FIG. 2, the system provided in an embodiment of the present invention includes an RNC 210 and a NodeB 220.

The RNC 210 needs to send a message for setting up/reconfiguring a shared E-DCH transmission channel to the NodeB 220.

The NodeB 220 needs to set up the shared E-DCH transmission channel according to parameters in the message, and exchange information with the RNC through an established shared E-DCH transmission bearer.

The NodeB 220 is further configured to return the information about the established shared E-DCH transmission channel to the RNC 210.

Afterward, information may be transmitted between the NodeB 220 and the RNC 210 through the established shared E-DCH transmission bearer.

When the RNC 210 sends the setup/reconfiguration request, the setup/reconfiguration request sent by the RNC 210 may carry a signature list used when the UE performs random access through the E-DCH, relevant physical-layer channel parameters required when the UE performs random access through the E-DCH, relevant physical-layer parameters required when the UE performs random access through the E-DCH, transmission channel parameters, or transmission bearer parameters, or any combination thereof.

The RNC 210 sends a setup/reconfiguration request and returns the information about the established shared E-DCH transmission channel to the NodeB 220, which is detailed above and not described further.

After the shared E-DCH transmission bearer channel is set up, if the NodeB 220 needs to send UE information to the RNC 210, the UE ID needs to be notified to the RNC 210. Specifically, after receiving the information sent by the UE, the NodeB 220 also needs to add the UE ID into the received information, with a view to modifying the data to new E-DCH data, or with a view to modifying the E-DCH FP frame corresponding to the data to the FP frame that carries the UE ID.

Accordingly, the RNC 210 needs to resolve the received information to obtain the UE ID. For example, for the new E-DCH data and E-DCH FP frame, the MAC-es entity in the RNC 210 needs to be modified. The implementation is detailed above, and is not described further.

The foregoing method and system embodiments reveal that: In the apparatus embodiment herein, the NodeB 220 needs to set up a shared E-DCH transmission channel according to the parameters in the message sent by the RNC 220, and may be further configured to return a channel setup/reconfiguration response to the RNC 210 to indicate the information about the established shared E-DCH transmission channel.

Accordingly, the RNC 210 needs to send a request for setting up/reconfiguring a shared E-DCH transmission channel to the NodeB 220.

After the shared E-DCH transmission channel is set up between the NodeB 220 and the RNC 210, the NodeB 220 may be further configured to: add an UE ID into the information transmitted by the UE through the shared E-DCH transmission channel and convert the data in the information into the E-DCH data that carries the UE ID, or convert the information into an FP frame that carries the UE ID, and send the modified information to the RNC 210 through the shared E-DCH transmission bearer.

Specifically, the NodeB 220 for transmitting information may include a transceiver module 221 that is configured to receive a message for setting up/reconfiguring a shared E-DCH transmission channel from the RNC 210; and a channel setup module 222 that is configured to set up the shared E-DCH transmission channel according to parameters in the message, and to control the transceiver module 221 to exchange information with the RNC 210 through an established shared E-DCH transmission bearer.

The NodeB may further include an identification module 223 that is configured to add a UE ID into the information received from the UE, to modify the data in the information to new E-DCH data or to modify the E-DCH FP frame corresponding to the data to the FP frame that carries the UE ID, and to control the transceiver module 221 to send the modified information to the RNC 210 through the shared E-DCH transmission channel.

The foregoing embodiment reveals that random access may also be performed between the RNC and the NodeB through an E-DCH, thus saving the channel resources between the RNC and the NodeB.

The NodeB and RNC in the embodiments of the present invention may be replaced with other devices of equivalent functions. These alternatives also fall within the scope of protection of the present invention Based on the descriptions of the preceding embodiments, those skilled in the art may understand that the present invention may be implemented by hardware only or by software and a necessary universal hardware platform. The technical solution of the present invention may be embodied by a software product which may be stored in a nonvolatile storage medium. The storage medium can be a Compact Disk Read-Only Memory (CD-ROM), a USB disk, or a mobile hard disk. The software product includes a number of instructions that enable a computer device (personal computer, server, or network device) to execute the methods provided in the embodiments of the present invention.

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A method for configuring an enhanced dedicated channel related resource, comprising:
    sending, by a radio network controller (RNC) to a NodeB, a message for configuring or reconfiguring an enhanced dedicated channel (E-DCH) related resource, wherein the E-DCH related resource corresponds to an E-DCH as a common transport channel, and wherein the message comprises the following: a signature list including a preamble signature for a random access request, E-DCH physical layer information, and a transmission bearer parameter; and
    receiving, by the RNC, a response from the NodeB, wherein the response comprises information about the E-DCH related resource that is configured or reconfigured by the NodeB according to the message, and the E-DCH related resource is configured or reconfigured by the NodeB before the NodeB receives a random access request from a user equipment (UE).

2. The method of claim 1, wherein the information about the E-DCH related resource that is configured or reconfigured by the NodeB comprises at least one of a transmission layer address and a binding identification (ID).

3. The method of claim 1, further comprising:
    receiving, by the RNC through an E-DCH resource for transmission between the RNC and the NodeB, a frame protocol (FP) frame which carries a user equipment identification (UE ID), wherein the FP frame is converted by the NodeB from data sent by the UE, and wherein the E-DCH resource for transmission between the RNC and the NodeB is included in the E-DCH related resource configured or reconfigured by the NodeB.

4. The method of claim 1, wherein the E-DCH physical layer information comprises at least one of: enhanced dedicated physical channel (E-DPCH) information, enhanced dedicated channel frequency division duplex (E-DCH FDD) information and fractional dedicated physical channel (F-DPCH) information.

5. The method of claim 4, wherein the E-DPCH information comprises at least one of the following items: a maximum set of an enhanced dedicated physical data channel (E-DPDCH), a puncture limit, enhanced transport format combination set (E-TFCS) information, enhanced transmission time interval (E-TTI), an enhanced dedicated physical control channel (E-DPCCH) power offset, and hybrid automatic repeat request (HARQ) information for the E-DCH.

6. The method of claim 1, wherein the transmission bearer parameter comprises at least one of: a binding identification (ID), a transport layer address, a common transport channel ID, a transport format set, and transport network layer (TNL) quality of service (QoS).

7. A radio network controller (RNC), comprising:
    a transmitter, configured to send to a NodeB a message for configuring or reconfiguring an enhanced dedicated channel (E-DCH) related resource, wherein the E-DCH related resource corresponds to an E-DCH as a common transport channel, and wherein the message comprises the following: a signature list including a preamble signature for a random access request, E-DCH physical layer information, and a transmission bearer parameter; and
    a receiver, configured to receive a response from the NodeB, wherein the response comprises information about the E-DCH related resource that is configured or reconfigured by the NodeB according to the message, and the E-DCH related resource is configured or reconfigured by the NodeB before the NodeB receives a random access request from a user equipment (UE).

8. The RNC of claim 7, wherein the information about the E-DCH related resource that is configured or reconfigured by the NodeB comprises:
at least one of a transmission layer address and a binding identification (ID).

9. The RNC of claim 7, wherein the receiver is further configured to receive, through an E-DCH resource for transmission between the RNC and the NodeB, a frame protocol (FP) frame which carries a user equipment identification (UE ID), wherein the FP frame is converted by the NodeB from data sent by the UE, and wherein the E-DCH resource for transmission between the RNC and the NodeB is included in the E-DCH related resource configured or reconfigured by the NodeB.

10. The RNC of claim 7, wherein, the E-DCH physical layer information comprises at least one of: enhanced dedicated physical channel (E-DPCH) information, enhanced dedicated channel frequency division duplex (E-DCH FDD) information and fractional dedicated physical channel (F-DPCH) information.

11. The RNC of claim 10, wherein the E-DPCH information comprises at least one of the following items: a maximum set of an enhanced dedicated physical data channel (E-DPDCH), a puncture limit, enhanced transport format combination set (E-TFCS) information, enhanced transmission time interval (E-TTI), an enhanced dedicated physical control channel (E-DPCCH) power offset, and hybrid automatic repeat request (HARQ) information for the E-DCH.

12. The RNC of claim 7, wherein the transmission bearer parameter comprises at least one of: a binding identification (ID), a transport layer address, a common transport channel ID, a transport format set, and transport network layer (TNL) quality of service (QoS).

13. A non-transitory computer readable medium storing executable codes, which, when executed by a processor of a base station, cause the base station to perform the following steps:
receiving a message for configuring or reconfiguring an enhanced dedicated channel (E-DCH) related resource from a radio network controller (RNC), wherein the E-DCH related resource corresponds to an E-DCH as a common transport channel, and wherein the message comprises following parameters: a signature list including a preamble signature for a random access request, E-DCH physical layer information, and a transmission bearer parameter; and
configuring or reconfiguring the E-DCH related resource according to the message before the base station receives a random access request from a user equipment (UE).

14. The non-transitory computer readable medium of claim 13, wherein the steps further comprise:
transmitting information about the configured or reconfigured E-DCH related resource to the RNC, wherein the information comprises at least one of a transmission layer address and a binding identification (ID).

15. The non-transitory computer readable medium of claim 13, wherein the steps further comprise:
converting data sent by the UE into a frame protocol (FP) frame carrying a user equipment identification (UE ID) of the UE; and
transmitting the FP frame to the RNC through an E-DCH resource for transmission between the RNC and the base station, wherein the E-DCH resource for transmission between the RNC and the base station is included in the E-DCH related resource configured or reconfigured by the base station.

16. The non-transitory computer readable medium of claim 13, wherein the E-DCH physical layer information comprises at least one of: enhanced dedicated physical channel (E-DPCH) information, enhanced dedicated channel frequency division duplex (E-DCH FDD) information and fractional dedicated physical channel (F-DPCH) information.

17. The non-transitory computer readable medium of claim 16, wherein the E-DPCH information comprises at least one of the following items: a maximum set of an enhanced dedicated physical data channel (E-DPDCH), a puncture limit, enhanced transport format combination set (E-TFCS) information, enhanced transmission time interval (E-TTI), an enhanced dedicated physical control channel (E-DPCCH) power offset, and hybrid automatic repeat request (HARQ) information for the E-DCH.

18. The non-transitory computer readable medium of claim 13, wherein the transmission bearer parameter comprises at least one of:
a binding identification (ID),
a transport layer address,
a common transport channel ID,
a transport format set, and transport network layer (TNL) quality of service (QoS).

19. A method for configuring an enhanced dedicated channel related resource, comprising:
receiving, by a base station, a message from a radio network controller (RNC) for configuring or reconfiguring an enhanced dedicated channel (E-DCH) related resource, wherein the E-DCH related resource corresponds to an E-DCH as a common transport channel, and wherein the message comprises following parameters: a signature list including a preamble signature for a random access request, E-DCH physical layer information, and a transmission bearer parameter; and
configuring or reconfiguring, by the base station, the E-DCH related resource according to the message before the base station receives a random access request from a user equipment (UE).

20. The method according to claim 19, further comprising:
transmitting, by the base station, information about the configured or reconfigured E-DCH related resource to the RNC, wherein the information comprises at least one of a transmission layer address and a binding identification (ID).

21. The method according to claim 19, further comprising:
converting, by the base station, data sent by the UE into a frame protocol (FP) frame carrying a user equipment identification (UE ID) of the UE; and
transmitting, by the base station, the FP frame to the RNC through an E-DCH resource for transmission between the RNC and the base station, wherein the E-DCH resource for transmission between the RNC and the base station is included in the E-DCH related resource configured or reconfigured by the base station.

22. The method according to claim 19, wherein the E-DCH physical layer information comprises at least one of: enhanced dedicated physical channel (E-DPCH) information, enhanced dedicated channel frequency division duplex (E-DCH FDD) information and fractional dedicated physical channel (F-DPCH) information.

23. The method according to claim 22, wherein the E-DPCH information comprises at least one of the following items: a maximum set of an enhanced dedicated physical data channel (E-DPDCH), a puncture limit, enhanced transport format combination set (E-TFCS) information, enhanced transmission time interval (E-TTI), an enhanced dedicated physical control channel (E-DPCCH) power offset, and hybrid automatic repeat request (HARQ) information for the E-DCH.

24. The method according to claim 19, wherein the transmission bearer parameter comprises at least one of:
   a binding identification (ID),
   a transport layer address,
   a common transport channel ID,
   a transport format set, and
   transport network layer (TNL) quality of service (QoS).

\* \* \* \* \*